Sept. 7, 1954     A. F. SHOOLTZ ET AL     2,688,496
TRAILER HITCH

Filed July 15, 1950     2 Sheets-Sheet 1

ALWIN F. SHOOLTZ
CLEO J. BROWN
JAMES H. SNOW
*INVENTOR.*

BY
*Richard A. Parsons*
ATTORNEY

Sept. 7, 1954  A. F. SHOOLTZ ET AL  2,688,496
TRAILER HITCH
Filed July 15, 1950  2 Sheets-Sheet 2

ALWIN F. SHOOLTZ
CLEO J. BROWN
JAMES H. SNOW
*INVENTOR.*

BY
*Richard A. Parsons*
ATTORNEY

Patented Sept. 7, 1954

2,688,496

UNITED STATES PATENT OFFICE 2,688,496

TRAILER HITCH

Alwin F. Shooltz, Lansing, Cleo J. Brown, Eaton Rapids, and James H. Snow, Lansing, Mich., assignors to themselves as trustees Application July 15, 1950, Serial No. 174,058

1 Claim. (Cl. 280—491)

This invention relates to trailer hitches for vehicles, and particularly to those used for towing a trailer behind a passenger automobile.

The principal object of the invention is to provide a trailer hitch of sturdy construction, having a portion quickly removable so that when not in use nothing projects beyond the rear end of the towing vehicle.

A further object is to provide a hitch of the above character in which the load of the trailer is transmitted to the vehicle frame.

These objects and others ancillary thereto will more fully appear in the following specification when read in connection with the accompanying drawings, wherein.

Figure 1:
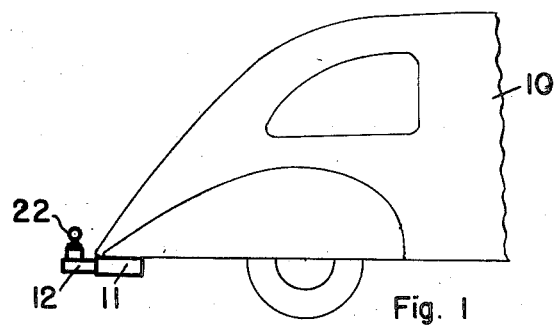
Figure 1 is a side view of an automobile provided with the invention.

Figure 1 shows a conventional passenger automobile 10 having the invention applied thereto, said invention comprising generally a fixed or female part 11 and a removable or male part 12. The female part is a tubular member rigidly attached to the chassis frame of the automobile, and extends longitudinally thereof. The female part is located centrally of the rear end of the automobile and with its rear end approximately flush with the rear end of the vehicle. In order to achieve one of the advantages of the invention the female part 11 should not project beyond the rear end of the automobile so that when not in use the trailer hitch does not have any unsightly protuberances.

The male part 12 is inserted in and fixedly attached to the part 11 by a bolt that can be easily and quickly removed so that the parts can be separated. The manner of attachment or separation of the parts will more fully appear presently.

Figure 3:
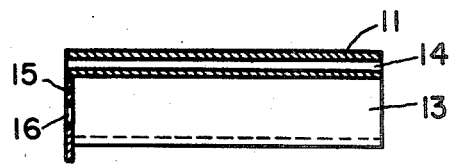
Figure 3 is a cross-sectional view taken on substantially the line 3—3 of Figure 2.
Figure 2:
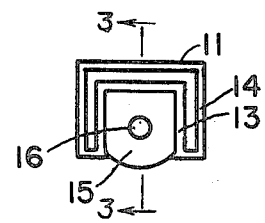
Figure 2 is a rear end view of the part of the hitch which is permanently attached to the frame of the vehicle.
Figure 5:
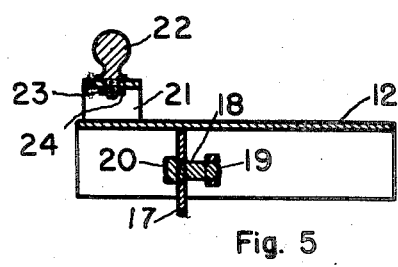
Figure 5 is a cross-sectional view taken on substantially the line 5—5 of Figure 4.
Figure 4:
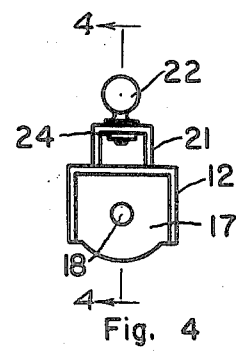
Figure 4 is a rear end view of the removable part of the trailer hitch.

Figures 2 to 5 show the parts of the hitch separated from each other, Figures 2 and 3 showing the female part 11 and Figures 4 and 5 the male part 12 and attaching bolt. The female part is an elongated tubular member composed of an inner channel shaped wall 13 and an outer channel shaped wall 14. The free edges of the channel shaped walls are integrally attached together, preferably by welding.

Within the inner channel shaped wall is a plate 15 arranged perpendicular to the sides of the wall and welded thereto. The plate 15 has an aperture 16 therein to receive a bolt for attaching the two parts of the hitch together.

The female member is rigidly attached to the chassis frame of the vehicle in any suitable manner so that the plate 15 is at the rear end thereof.

The male member 12 is a channel, preferably formed of heavy gauge steel and of a size to slide loosely into the female part 11. Intermediate its ends and interiorly thereof it is provided with a depending plate 17 having an aperture 18. The aperture 18 is arranged so as to be axially aligned with aperture 16 in plate 15 when the two parts of the hitch are attached together. A bolt 19 and nut 20 are shown positioned in the aperture in the plate 17. The bolt and nut are employed to hold the two parts of the hitch together.

On top of the rear end of the male member 13 is a support 21 for a ball 22. The support shown is a channel shaped piece welded to the member 13. The ball has a threaded shank which is received in a hole in the support 21 and is attached thereto by a nut 24. The support is used in the particular modification shown to raise the ball so that the draw bar of the trailer will be horizontal, or substantially so, when the latter is attached to the ball. The support may be dispensed with if desired, and the ball attached directly to the member 12.

The members 11 and 12 are secured together by removing nut 20 and bolt 19 from member 12 and inserting the front end of member 12 into the space between the channel shaped walls 13 and 14 until plates 15 and 17 are in contact. The bolt is then passed through apertures 16 and 18, the nut 20 applied and threaded home.

It will be noted that the non-circular cross sections of the two members 11 and 12 prevent relative twisting thereof, about a horizontal axis. The two major members of the hitch carry the load of the trailer, thereby relieving the bolt of shearing stress so that the latter is in tension only which the latter can easily stand.

Figure 6:
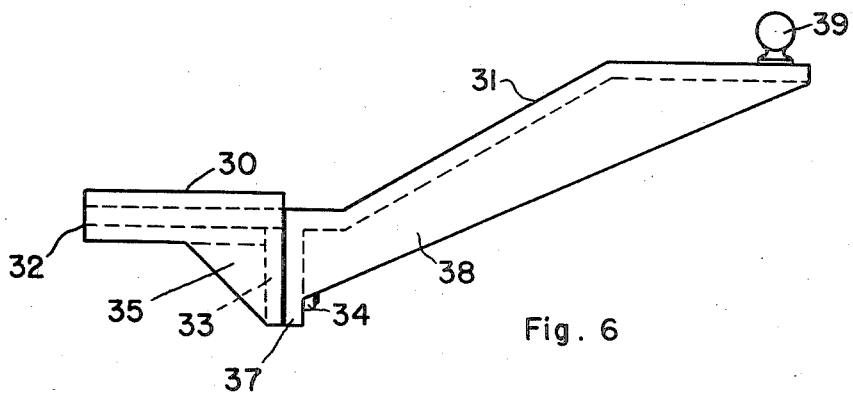
Figure 6 is a side view of a modified form of the invention.
Figure 7:
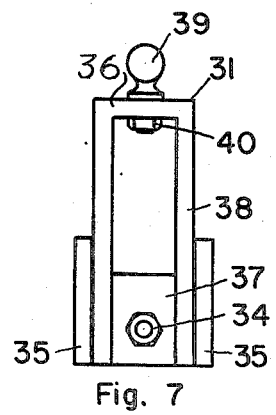
Figure 7 is a rear end view thereof.
Figure 8:
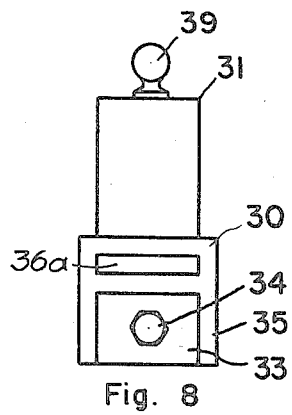
Figure 8 is a front end view thereof.

Figures 6 and 7 illustrate a modified form of the invention employed for lighter trailers than those for which the previous form is designed. It is formed of two parts, a female member 30 and a male member 31. The female member is adapted to be rigidly connected to the chassis frame of an automobile in much the same manner as the form previously described.

The female member comprises a tube 32 of relatively flat, wide rectangular cross section. At its rear end is a depending plate 33 which is provided with an aperture to receive a bolt 34. A pair of triangular gussets 35 are attached to the depending plate and to the sides of the tube 32 to brace the same.

The male member 31 is an elongated top part having an extension tongue 36a of a size to fit slidably within the tube 32. Intermediate its ends it is provided with a depending plate 37 having an aperture to receive the bolt 34. The plate 37 is strengthened by triangular gussets 38 attached to the plate and the top part 36. The free rear end of the top part carries a ball 39 for connection to a trailer draw bar.

The two parts are connected together by bolt 34 and nut 40 in much the same manner as the previously described form of the invention. As in that form, the two parts can be quickly and easily disassembled, cannot twist relative to each other, and relieve the bolt of shearing stress.

Accordingly, it will be apparent that this invention is a marked improvement over previous trailer hitches in that when not in use there are no parts to project beyond the outer confines of the vehicle to detract from the appearance of the vehicle or cause injury to persons or property, yet the hitch can be quickly made ready to haul a trailer. It is a sturdy and rugged hitch, yet simple in construction.

The scope of the invention is indicated in the appended claim.

We claim:

A trailer hitch for a towing vehicle comprising an elongated tubular female member of non-circular interior cross-section adapted to be rigidly connected to the towing vehicle, an elongated male member of substantially the same exterior cross-section as the interior of the female member located therein and having a portion projecting rearwardly therefrom, said male and female members each having a vertical plate rigidly attached thereto, the plate on the female member being at the rear end thereof, the plate on the male member being spaced from the front end thereof a substantial distance, said plates extending transversely of said members, said plates being juxtaposed to each other, means on said plates for removably fastening said plates together, and means on the rearwardly projecting portion of the male member for attaching a trailer thereto.

References Cited in the file of this patent

UNITED STATES PATENTS

| Number | Name | Date |
|---|---|---|
| 2,097,006 | Weis | Oct. 26, 1937 |
| 2,397,964 | Hinker | Apr. 9, 1946 |
| 2,425,838 | Schultz | Aug. 19, 1947 |
| 2,474,231 | Crosley | June 28, 1949 |
| 2,485,743 | Koback | Oct. 25, 1949 |
| 2,569,086 | Zenk | Sept. 25, 1951 |